(12) United States Patent
Rupert

(10) Patent No.: US 7,173,194 B2
(45) Date of Patent: Feb. 6, 2007

(54) FLOOR ACCESS BOX ADJUSTMENT METHOD

(75) Inventor: Brian Rupert, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 0 days.

(21) Appl. No.: 11/345,830

(22) Filed: Feb. 2, 2006

(65) Prior Publication Data

US 2006/0169471 A1 Aug. 3, 2006

Related U.S. Application Data

(60) Provisional application No. 60/649,775, filed on Feb. 3, 2005.

(51) Int. Cl.
*H02G 3/04* (2006.01)

(52) U.S. Cl. ............... 174/480; 174/481; 174/53; 220/3.6; 439/131

(58) Field of Classification Search ............... 174/48, 174/50, 53, 480–481; 220/3.6, 3.8, 3.9; 439/131, 439/535

See application file for complete search history.

(56) References Cited

U.S. PATENT DOCUMENTS

| | | | | |
|---|---|---|---|---|
| 2,885,106 A * | 5/1959 | Miller | ............... | 220/3.6 |
| 3,590,137 A * | 6/1971 | Librandi | ............... | 174/58 |
| 3,844,440 A | 10/1974 | Hadfield et al. | ............... | 220/3.7 |
| 4,120,416 A | 10/1978 | Suk | ............... | 220/3.4 |
| 4,572,391 A | 2/1986 | Medlin | ............... | 220/3.9 |
| 4,899,506 A | 2/1990 | Chapman et al. | ............... | 52/221 |
| 5,257,487 A | 11/1993 | Bantz et al. | ............... | 52/220.1 |
| 5,449,859 A | 9/1995 | Bordwell | ............... | 174/48 |
| 5,575,668 A * | 11/1996 | Timmerman | ............... | 439/131 |
| 5,698,820 A | 12/1997 | Collard | ............... | 174/57 |
| 5,927,030 A | 7/1999 | Petit et al. | ............... | 52/220.1 |
| 6,669,041 B2 * | 12/2003 | Almond | ............... | 220/3.6 |
| 2004/0080903 A1 | 4/2004 | Byrne | ............... | 361/683 |

* cited by examiner

*Primary Examiner*—Dhiru R. Patel
(74) *Attorney, Agent, or Firm*—Taylor & Aust, P.C.

(57) ABSTRACT

An under-floor box system including a floor having an opening therein and a floor box position in the opening of the floor. The full box includes a housing and at least one fastening device partially retractable within the housing.

18 Claims, 4 Drawing Sheets

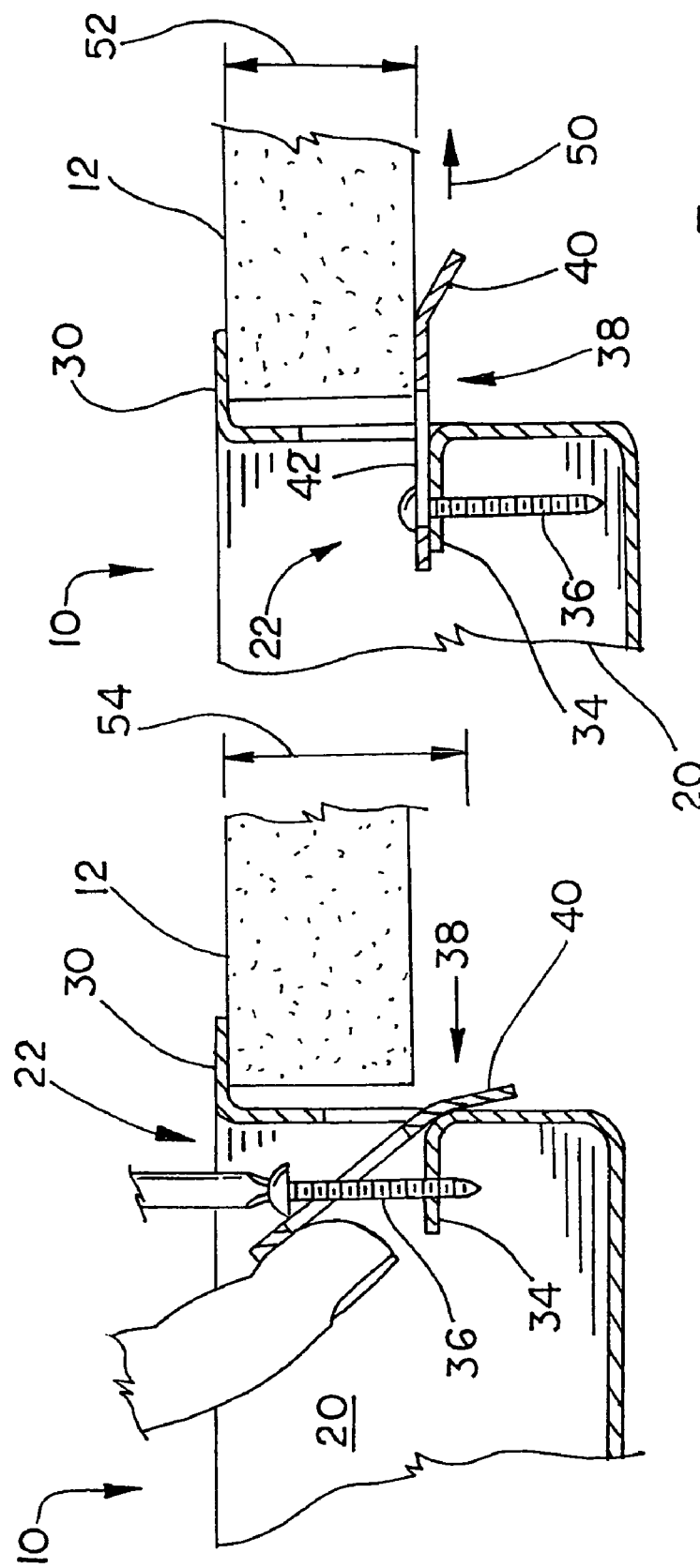

FLOOR ACCESS BOX ADJUSTMENT METHOD

CROSS REFERENCE TO RELATED APPLICATIONS

This is a provisional application based upon U.S. provisional patent application Ser. No. 60/649,775, entitled "Floor Access Box Adjustment Method", filed Feb. 3, 2005.

BACKGROUND OF THE INVENTION

1. Field of the Invention

The present invention relates to an under-floor box, and, more particularly, to an under-floor box installed through an opening in a floor.

2. Description of the Related Art

In the work office environment and on convention floors there are often an assortment of electrically operated hardware each requiring one or more separate connections to electrical and telecommunication outlets. The versatility of an under-floor box allows for a remaking of the floor plan in the office and/or convention floor. Under-floor boxes may be positioned before the pouring of concrete on a floor, which thereby permanently positions the under-floor box and is often used in areas where high strength flooring is utilized.

In certain construction techniques it is often advantageous to use a raised floor, which allows the running of electrical wiring cable therebeneath. To provide access to the electrical wiring and cabling, an opening is cut through the floor at a convenient location and the electrical service cables and communication lines are terminated in a box that is suspended from the raised floor. These in-floor boxes are generally open-ended box like containers that are substantially flush with the finished floor once inserted into the opening of the raised floor. A cover having slots and/or openings may be positioned over the open end of the box to cover the electrical connections therein.

It is known to fasten the floor box to the floor by utilizing a bracket that is first mounted underneath the floor and then the floor box is mounted directly to the bracket that has been secured to the bottom part of the floor opening.

What is needed in the art is a cost effective, easily installed and removed fastening for an under-floor box.

SUMMARY OF THE INVENTION

The present invention provides an under-floor box attachment method that allows easy securing of the under-floor box without requiring access to the underside of the floor for the installation of brackets thereunder.

The invention comprises, in one form thereof, an under-floor box system including a floor having an opening therein and a floor box positioned in the opening of the floor. The floor box includes a housing and at least one fastening device partially retractable within the housing.

An advantage of the present invention is that a bracket rotates angularly and extends underneath the floor and is secured by a screw to hold the under-floor box in position.

Another advantage of the present invention is that the bracket can be simply retracted after the loosing of a screw and the box removed through the floor opening.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

FIG. 4 is a cross sectional view of the fastener device of FIGS. 1–3 as it is being installed in a floor; and FIG. 5 is a cross sectional view of the fastener device of FIGS. 1–4 having been installed in an opening of a floor.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
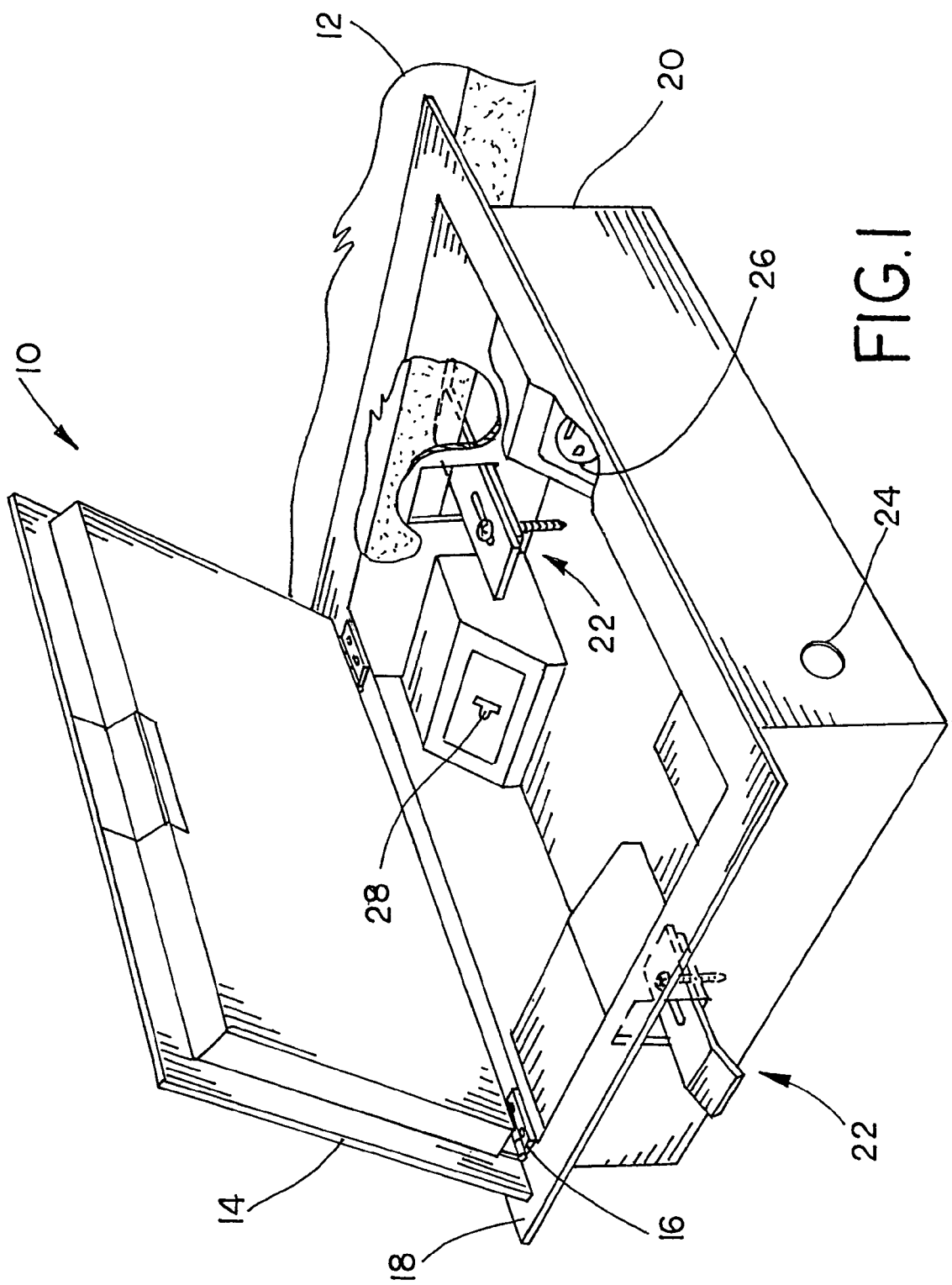
FIG. 1 is a perspective view of an embodiment of an under-floor box installed in a floor according to the present invention.
Figure 2:
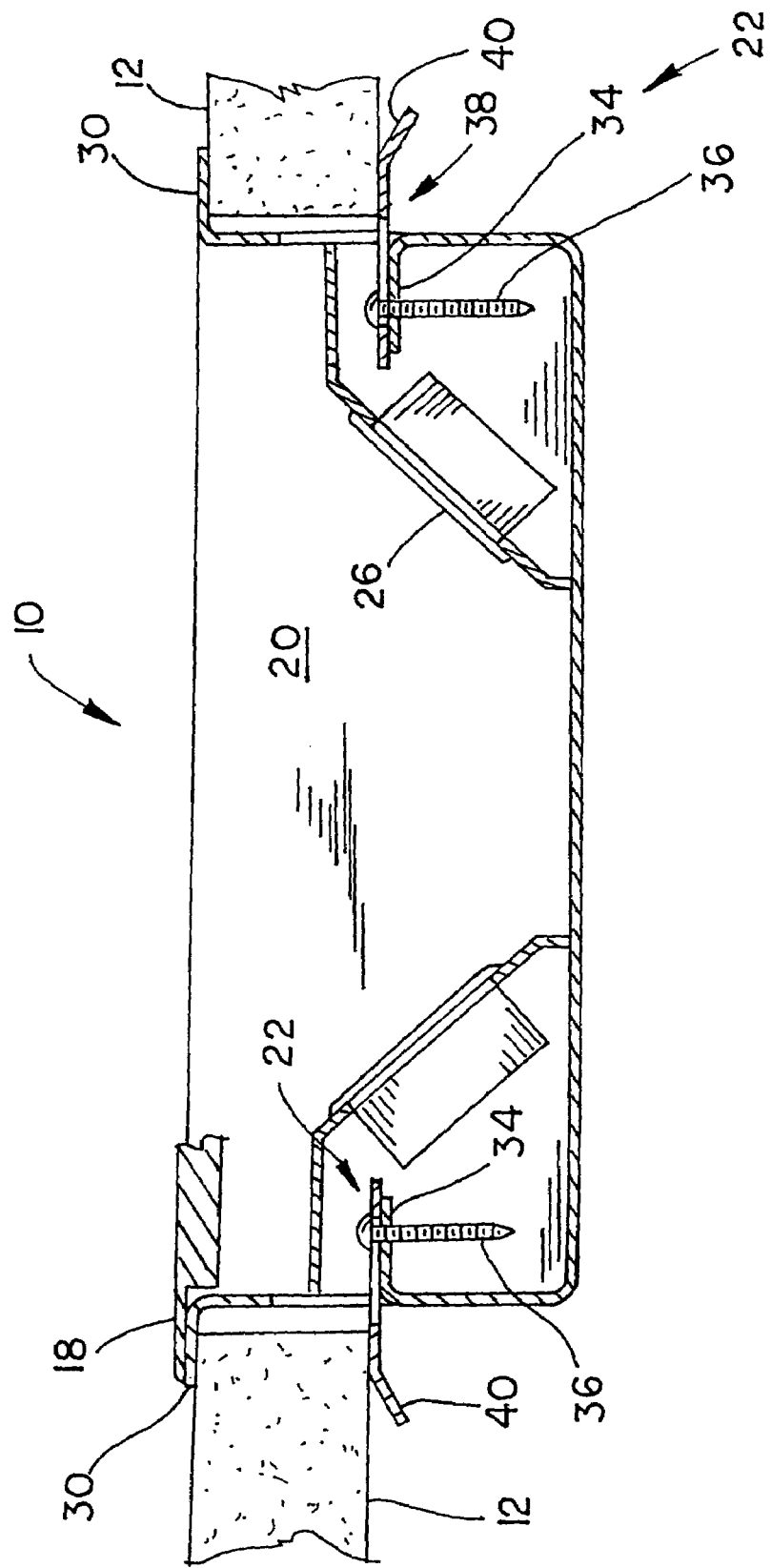
FIG. 2 is a cross sectional view of the under-floor box of FIG. 1.

Referring now to the drawings, and more particularly to FIGS. 1 and 2, there is shown an under-floor box system 10 installed in floor 12. Under-floor box 10 includes a lid 14, a hinge 16, a bezel 18, a housing 20 and fastening devices 22. Floor 12 is a floor or sub-floor having an opening cut therein throughwhich floor box 10 is positioned and secured by way of fastening devices 22. Lid 14 is attached to bezel 18 by way of hinge 16 and lid 14 may be directly connected by way of hinge 16 to housing 20 without the use of a bezel 18.

Within housing 20 there may be openings 24 that allow the entrance of power and data cables therethrough into the interior of housing 20. Electrical receptacle 26 and data receptacle 28 are removably placed within housing 20 and are respectively connected to electrical and data wiring.

Housing 20 includes a flange 30, opening 32 and a tab 34. Flange 30 extends outwardly from housing 20 and generally comes in contact with the top of floor 12, thereby retaining floor box 10 in an accessible position relative to the top of floor 12. Openings 32 may be formed by the bending away of tab 34 from a wall of housing 20 allowing tab 34 to be created from the material that is folded from opening 32. Opening 32 and tab 34 are variously formed in the side walls of housing 20 at opposing positions in housing 20.

Figure 3:
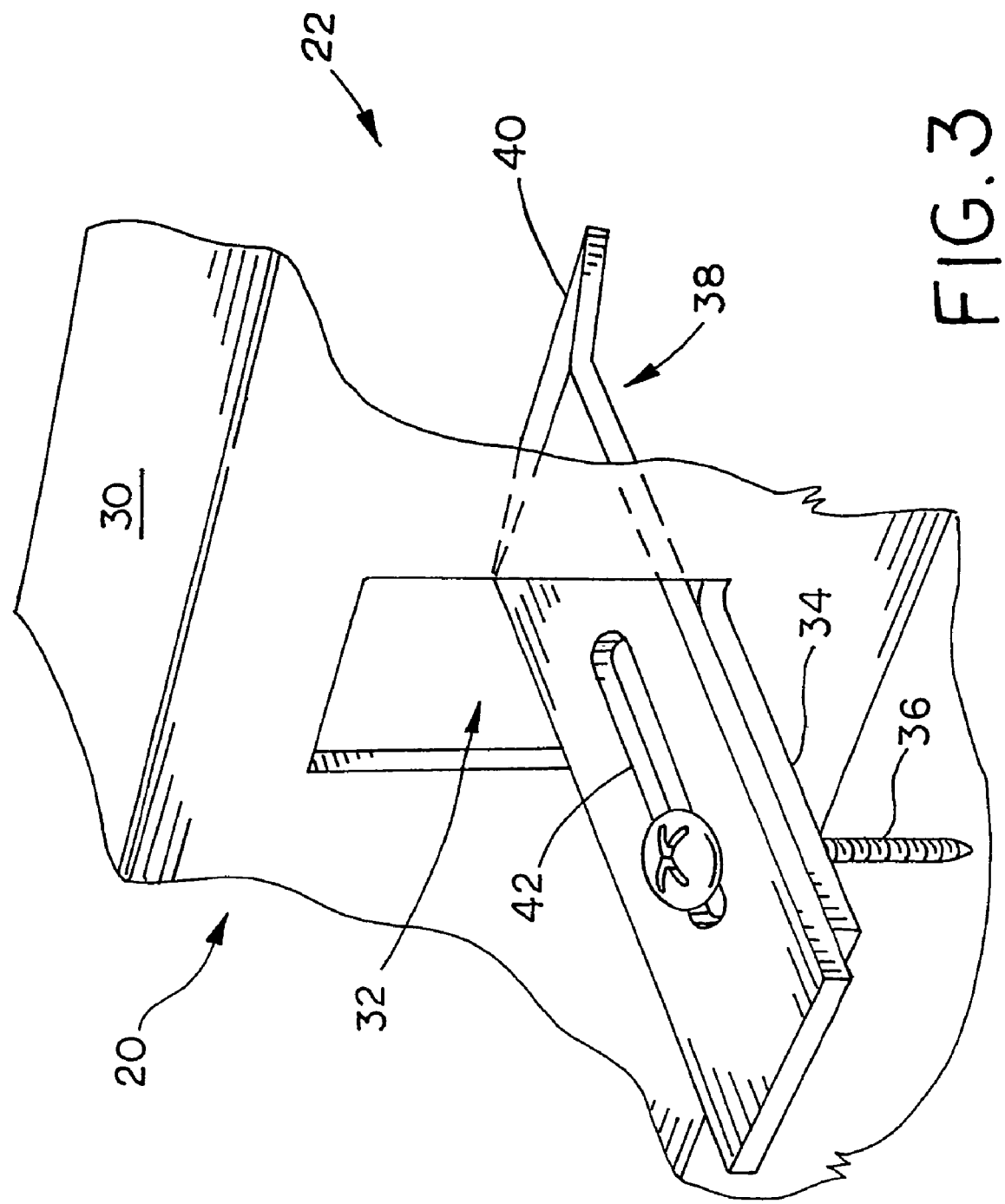
FIG. 3 is a perspective view of a fastener device utilized in the under-floor box of FIGS. 1 and 2.

Now, additionally referring to FIGS. 3–5 there is illustrated the details of fastening device 22, which co-act with openings 32 and tabs 34 to secure under-floor box system 10 to floor 12. Fastening device 22 includes a screw 36, and a cantilevered bracket 38. Screw 36 extends through cantilevered bracket 38 and screw 36 is threadingly engaged with tab 34 as cantilevered bracket 38 extends through opening 32. Cantilevered bracket 38 includes an angled portion 40 and a slot 42. Angled portion 40 extends through opening 32 to allow for irregular features that may occur on the bottom side of floor 12. Angled portion 40 advantageously allows for a snug fit as cantilevered bracket 38 is extended through opening 32 to further encounter the bottom side of floor 12. Slot 42 allows cantilever bracket 38 to be angularly and linearly displaced when screw 36 is generally extended above the upper surface of tab 34.

Prior to the installation of under-floor box system 10 into floor 12, screws 36 are extended upwardly from tab 34 and cantilevered brackets 38 are lifted so as to allow for sufficient clearance as under-floor box 10 is lowered in to an opening of floor 12. Once flange 30 is in contact with an upper portion of floor 12 cantilevered brackets 38 are released and are slid in direction 50 to extend cantilever bracket 38 outwardly allowing angle portion 40 and a non-angled portion to come in contact with the bottom of floor 12. Screw 36 is then tightened, thereby securing under-floor box 10 to floor 12. Floor 12 has a floor height 52 and under-floor box system 10 has an accommodating height 54 of fastening device of 22. Floor height 52 can vary to some extent, since accommodating height 54 of fastening device 22 is sufficient to allow cantilevered bracket 38 to be installed in angled positions with screw 36 not drawing bracket 38 into a flat contact with tab 34. Nonetheless, under-floor box 10 is not removable from floor 12 until screw 36 is loosened and cantilever bracket 38 is drawn inwardly and upwardly for the removable of under-floor box system from floor 12.

Advantageously, the present invention allows for an easy installation and securing of under-floor box system 10 in a floor 12, without requiring the installation of any brackets beneath floor 12. Further, tab 34 is effectively constructed by the forming of opening 32. The co-acting of slot 42 with screw 36 allows for the combined angular and linear retraction of cantilever bracket 38.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the -limits of the appended claims.

What is claimed is:

1. An under-floor box system, comprising:
   a floor having an opening therein; and
   a floor box positioned in said opening of said floor, said floor box including:
   a housing; and
   at least one fastening device including a bracket and an adjustable fastener, said bracket including an elongated closed slot, said adjustable fastener extending through said elongated closed slot thereby allowing said bracket to be at least partially retracted within said housing prior to and after said floor box is positioned in said floor.

2. The system of claim 1, wherein said bracket is linearly displaceable.

3. The system of claim 2, wherein said bracket is also angularly displaceable.

4. The system of claim 3, wherein said housing includes an opening and a tab, said bracket extending through said opening of said housing, said bracket being secured to said tab by said adjustable fastener.

5. The system of claim 1, wherein said at least one fastening device is a plurality of fastening devices positioned at opposing locations about said housing.

6. An under-floor box system, comprising:
   a floor having an opening therein;
   a floor box positioned in said opening of said floor, said floor box including:
   a housing; and
   at least one fastening device partially retractable within said housing, said at least one fastening device including a linearly displaceable bracket, said bracket is also angularly displaceable, said at least one fastening device including an adjustable fastener that extends through a portion of said bracket, said housing including an opening and a tab, said bracket extending through said opening of said housing, said bracket being secured to said tab by said adjustable fastener, said tab being formed by material bent from said opening of said housing.

7. The system of claim 6, wherein said bracket includes a slot through which said adjustable fastener extends.

8. The system of claim 7, wherein said bracket includes an end that extends beyond said housing, said end being angled relative to said slot.

9. An under-floor box for positioning in an opening of a floor, said under-floor box comprising:
   a housing; and
   at least one fastening device including a bracket and an adjustable fastener, said bracket including an elongated closed slot, said adjustable fastener extending through said elongated closed slot thereby allowing said bracket to be at least partially retracted within said housing prior to and after said floor box is positioned in said floor.

10. The under-floor box of claim 9, wherein said bracket is linearly displaceable.

11. The under-floor box of claim 10, wherein said bracket is also angularly displaceable.

12. The under-floor box of claim 11, wherein said housing includes an opening and a tab, said bracket extending through said opening of said housing, said bracket being secured to said tab by said adjustable fastener.

13. The under-floor box of claim 9, wherein said at least one fastening device is a plurality of fastening devices positioned at opposing locations about said housing.

14. An under-floor box for positioning in an opening of a floor, said under-floor box comprising:
    a housing; and
    at least one fastening device partially retractable within said housing, said at least one fastening device includes a linearly displaceable bracket, said bracket being also angularly displaceable, said at least one fastening device including an adjustable fastener that extends through a portion of said bracket said housing including an opening and a tab, said bracket extending through said opening of said housing, said bracket being secured to said tab by said adjustable fastener, said tab is being formed by material bent from said opening of said housing.

15. The under-floor box of claim 14, wherein said bracket includes a slot through which said adjustable fastener extends.

16. The under-floor box of claim 15, wherein said bracket includes an end that extends beyond said housing, said end being angled relative to said slot.

17. A method of securing an under-floor box to a floor, comprising the steps of:
    positioning the under-floor box in an opening in the floor:
    extending at least one bracket through an opening in a side of a housing of the under-floor box; and
    allowing movement of said at least one bracket along an adjustable fastener prior to and during said extending step, said adjustable fastener extending through an elongated slot in said at least one bracket.

18. The method of claim 17, wherein said at least one bracket moves angularly relative to said side during said extending step.

* * * * *